United States Patent [19]

Dickinson

[11] 4,326,289

[45] Apr. 20, 1982

[54] EXPANDABLE COMMUNICATION SYSTEM

[76] Inventor: Robert V. C. Dickinson, 32 Debbie Pl., Berkeley Heights, N.J. 07922

[21] Appl. No.: 125,440

[22] Filed: Feb. 28, 1980

[51] Int. Cl.³ ............................. H04J 3/08; H04J 3/02
[52] U.S. Cl. ......................................... 370/85; 370/30
[58] Field of Search ....................... 370/85, 30, 83, 79, 370/92, 96, 50

[56] References Cited

U.S. PATENT DOCUMENTS

| | | | |
|---|---|---|---|
| 3,889,064 | 6/1975 | Fletcher | 370/85 |
| 3,898,373 | 8/1975 | Walsh | 370/85 |
| 3,924,240 | 12/1975 | Given | 370/85 |
| 4,107,471 | 8/1978 | Reed | 370/30 |
| 4,155,115 | 5/1979 | Wilske | 370/92 |

*Primary Examiner*—Douglas W. Olms

[57] ABSTRACT

A communication system in which individual stations are connected to a control center by a transmission medium common to all of the stations to allow the transmission medium common to all of the stations to allow the transmission of messages in the form of digital signals between the control center and the individual stations. The length of a message transmitted to or from a specific station is determined by the information content of that message and is independent of the length of other messages to or from the same station or other stations. In particular, the invention relates to stations for use in such a system, and especially to means provided in each station to allow modular expansion units to be connected directly to the station or to another modular expansion unit that is connected, directly or indirectly, to the station.

11 Claims, 6 Drawing Figures

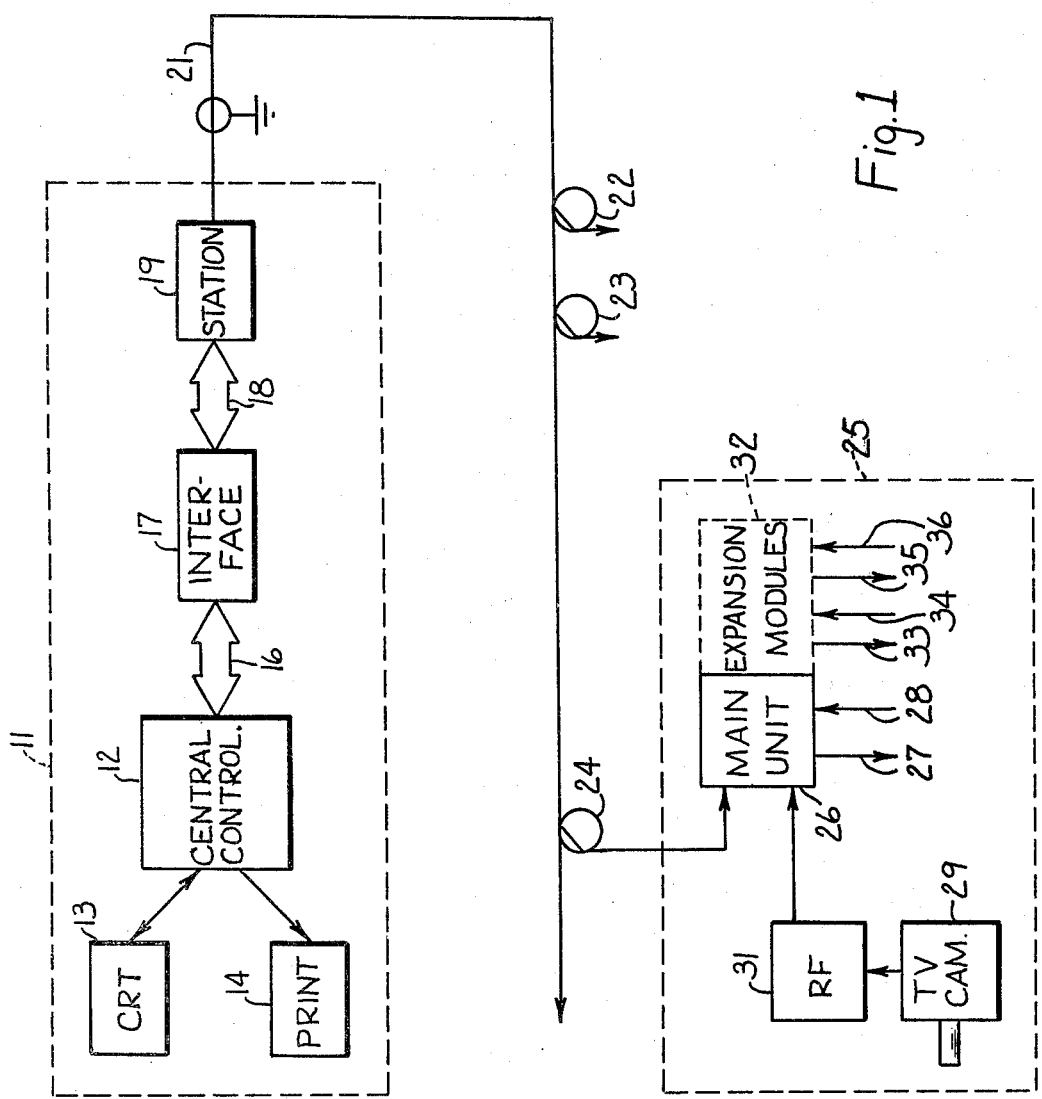

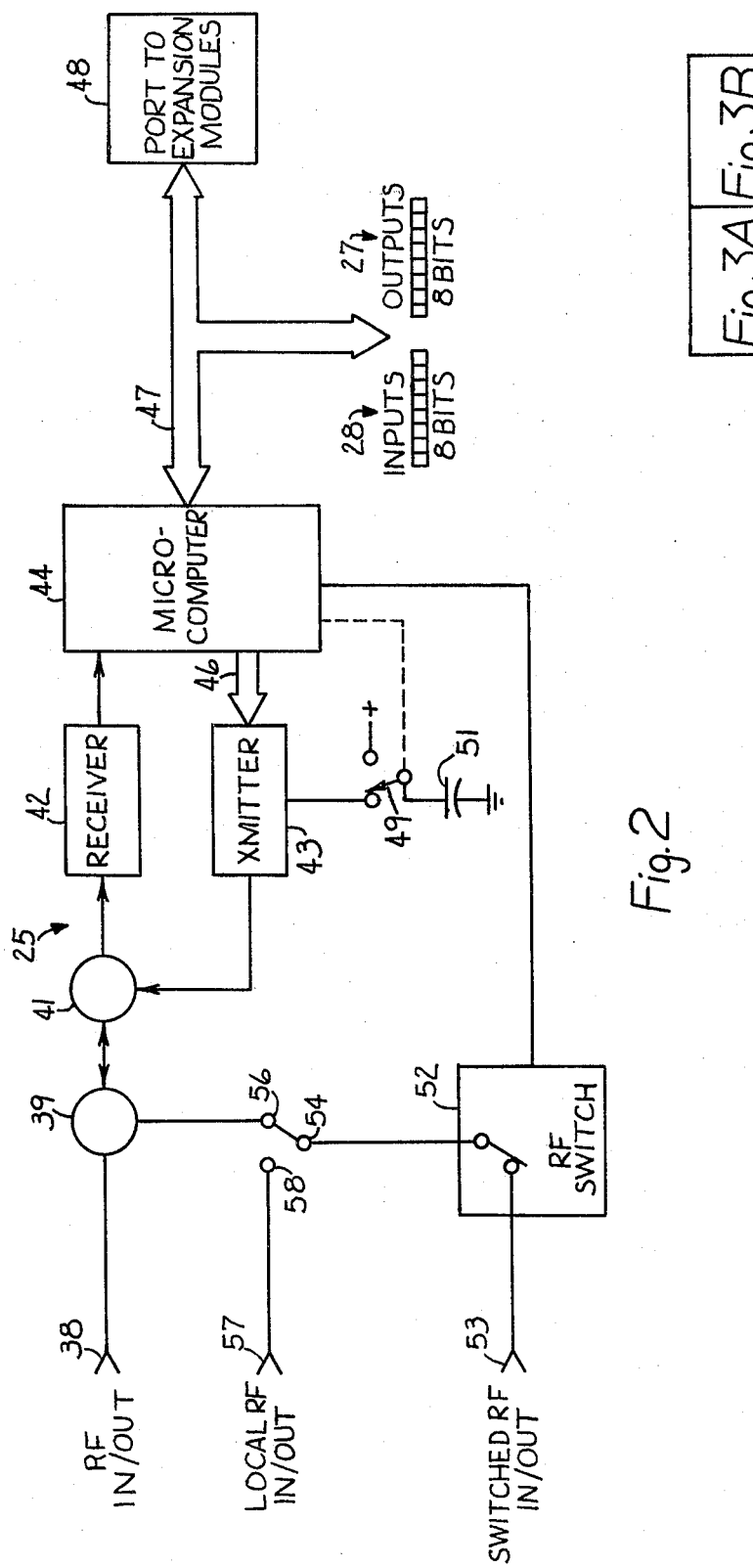

EXPANDABLE COMMUNICATION SYSTEM

BACKGROUND OF THE INVENTION

This invention relates to a communication system in which individual stations are connected to a control center by a transmission medium common to all of the stations to allow the transmission of messages in the form of digital signals between the control center and the individual stations. The length of a message transmitted to or from a specific station is determined by the information content of that message and is independent of the length of other messages to or from the same station or other stations. In particular, the invention relates to stations for use in such a system, and especially to means provided in each station to allow modular expansion units to be connected directly to the station or to another modular expansion unit that is connected, directly or indirectly, to the station. The modular expansion units make it possible for the information-handling capability of each station to be tailored to requirements specific to that station without burdening other stations with the need to provide such additional capability.

One well-known type of signal distribution system is a community antenna television (CATV) system in which television signals are applied to a transmission medium, usually a coaxial cable, by equipment at a central station that is commonly known as a "head end." These television signals are transmitted along the cable and can be picked up by television receivers connected to terminals at spaced points on the cable. In a simple form of CATV system, the television signals are transmitted in only one direction, called the downstream direction, away from the head end, and no circuits and provided by which the receiver can be controlled from the head end.

More sophisticated systems provide for additional signals to be transmitted downstream to control the individual receivers so as to determine which television signals can be received by each of the receivers. This requires control circuits at each subscriber's receiver, but the requirements are the same for each installation. It is not necessary to provide means for expanding the signal-handling capability of any of the receivers relative to others.

It has also been proposed to use the wideband facilities of a CATV network to transmit large quantities of data between two points on the network. The equipment at each station may be quite different from that at any other station, and the advantage of having relatively simple, basic equipment with provision for modular expansion to equipment capable of handling additional information or processing it differently has not been explored.

Still other digital communication systems operate on a synchronous, or bit-oriented, basis in which a clock signal is maintained continuously. This has the advantage of permitting a simple synchronizing signal to be used to indicate the start of each message, but it has the distinct disadvantage of requiring no idle time between messages. Synchronous systems can be more efficient than byte-oriented asynchronous systems in the transmission of long messages but are not as flexible in the spacing and arrangement of messages.

OBJECTS AND SUMMARY OF THE INVENTION

It is one of the objects of this invention to provide an exapndable communication system in which each system station is provided with a built-in computer that makes it capable of handling digital data in messages of variable lengths, as necessary to transmit the data. Each system station includes means to connect one or more expansion module circuits to the basic system station to handle longer messages or additional data or data of a type, such as teletypewriter signals, required for that particular station but not required for all of the other stations in the same system.

Another object of the invention is to provide a system station capable of receiving and transmitting digital signals and provided with input and output port means to connect to apparatus at the location of the station and further provided with expansion terminals means to allow the connection of an expansion module with a module address circuit to permit the module to be addressed through the system station by way of the expansion terminal means.

A further object is to provide an expandable communication system that operates asynchronously.

Yet another object is to provide a system station with means to add expansion modules individually addressable under the general address of the station.

Further objects will be apparent from the following detailed description of the invention and the accompanying drawings.

A communication station constructed in accordance with the present invention includes a digital processing circuit, such as a microprocessor, that includes terminals to be connected to bus circuits within the station. Data can be applied through those circuits to the processing circuit to be processed and returned to the bus circuits. The processing circuit also includes control circuits and output terminals through which control signals can be obtained to control other circuits that form part of the station and circuits in expansion modules connected to the station.

The system station further includes receiving means and transmitting means connected to the bus circuits and the control circuits of the digital processor circuit. The receiving and transmitting means allow connection of the station to a suitable signal-carrying medium. The receiving and transmitting means may comprise appropriate parts of a universal asynchronous receiver and transmitter (UART) and typically include RF receiving and demodulating circuits and RF generating the modulating circuits, although such RF circuits are not necessary if appropriate time sharing is employed.

In addition, the basic station unit includes input and output ports, each of which is a multi-terminal device capable of handling, simultaneously, a number of digital signals appropriate to the number of bits in each byte of the signals for which the apparatus was designed. A satisfactory number of bits per byte is eight, which is consistent with the 8-bit microprocessors and related equipment currently available. The input and output port circuits also include circuits connected to the control signal terminals to be selected actuated, or enabled, by signals from the processing circuit.

The basic unit of a communication station according to the present invention includes an expansion terminal having a plurality of connectors sufficient to accommodate data bus and address circuits and control circiuts sufficient to control the operation of circuits in the expansion module.

Further in accordance with the present invention, the expansion modules, themselves, include expansion terminal means to permit additional expansion modules to be cascaded onto the first one.

BRIEF DESCRIPTION OF THE DRAWINGS

FIG. 1 is a block diagram of a communication system incorporating the present invention.

FIG. 2 is a simplified block diagram of a basic system station unit incorporating the invention.

FIG. 4 is a map of FIGS. 3A and 3B.

DETAILED DESCRIPTION OF THE INVENTION

Figure 3A:
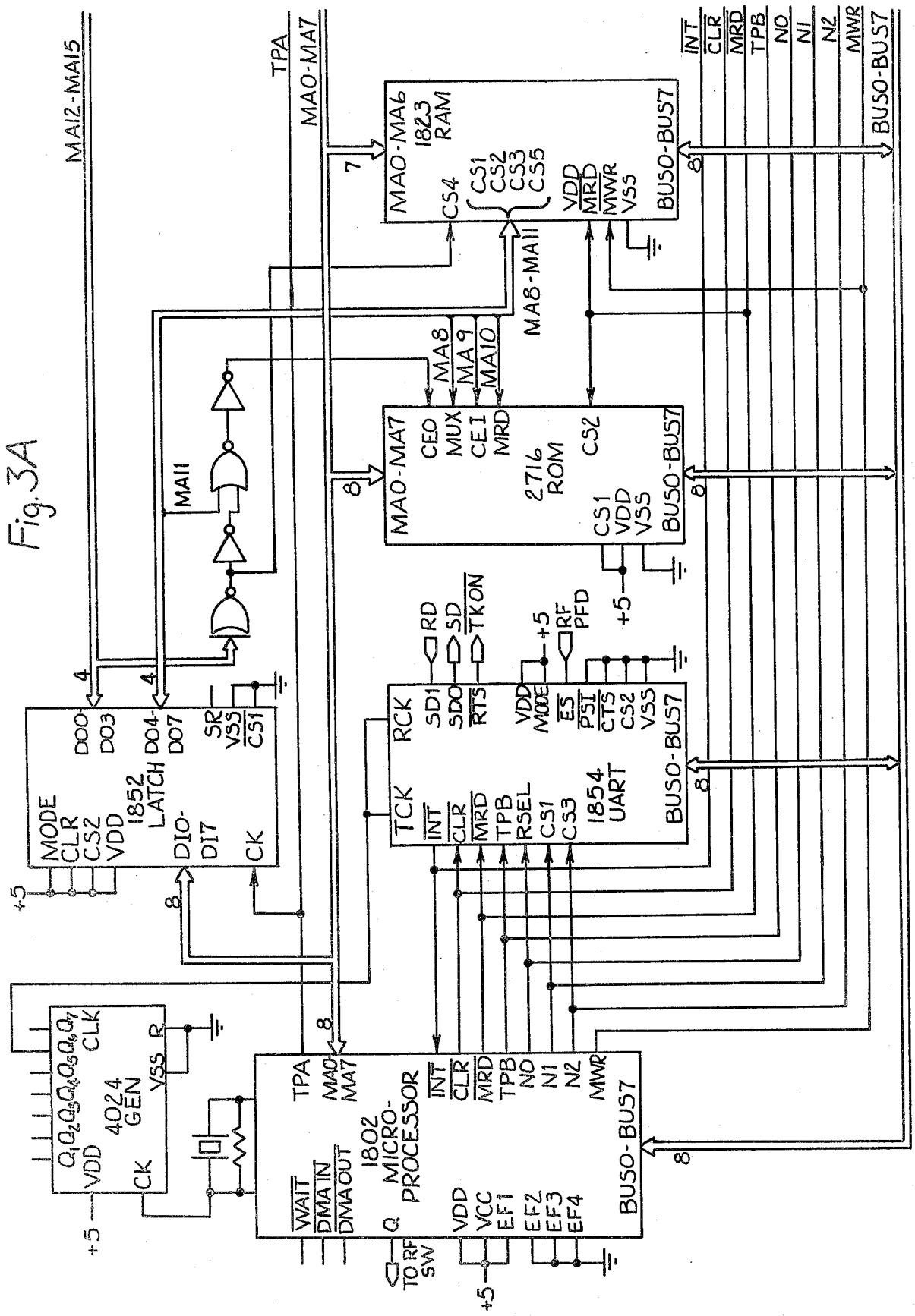
FIGS. 3A and 3B are circuit diagrams of the digital signal circuits in the station in FIG. 2.

The system in FIG. 1 includes a central station 11 which, in this embodiment, includes a central controller 12, such as a computer capable of handling the amount of information necessary to operate the entire system. This controller is connected to a cathode ray terminal 13 on which data can be displayed. The terminal 13 may also include, as is typical of such terminals, a keyboard through which control information can be directed to the controller 12. The controller is also connected to a printer 14 to print out hard copy corresponding to the data displayed on the face of the cathode ray tube or corresponding to such other data as the controller 12 may be programmed to cause to be printed out.

The controller 12 is connected by a bus 16, which could be an RS 232 interface, to an interface unit 17 connected by another bus 18 to a station 19. The station 19 may be virtually identical to each of the system stations, as will be described in connection with FIG. 2. The interface 17 operates on data from the controller 12 to place it in suitable condition for transmission via the station 19 to a transmission medium, such as a coaxial cable 21. The interface 17 also operates on data received by the station 19 to place that data in a form suitable to utilization by the controller 12.

In this embodiment, the transmission medium 21 is a coaxial cable. Other forms of transmission media may be used provided they are capable of transmitting data in both directions with the required frequencies and bandwidths. A coaxial cable is suitable for handling a wide band and for transmitting signals in both direction, but other media such as fiber optics, can also be used.

The transmission medium 21, which will be referred to hereinafter as a cable, is shown as having three power dividers, or directional couplers, 22–24 connected at spaced points. The actual spacing between the points is not significant, and any two directional couplers may be as close together as is physically permissible or as far apart as the entire length of the transmission medium. The directional coupler 24 is shown connected to a system station 25 that includes a main unit 26 that has an output port 27 and an input port 28, each of which is capable of handling multibit digital signals. Because of the digital nature of information processed by this system, the number of bits of the information to be handled by the output and the input ports is commonly some power of 2, i.e., 4, 8, or 16, although other bit numbers may be used. A system based on eight data bits per byte can conveniently handle a reasonable amount of information for a system of the type shown in FIG. 1 without requiring excessively broadband circuits or operating at an undesirably slow speed.

In this embodiment, the system station 25 is shown as including a television camera 29 connected to an RF circuit 31. The latter typically includes an RF carrier generator and a modulator to which the camera 29 is connected so that the television output signal of the camera can modulate the carrier. The modulated carrier is then connected to the main connector through which the system station 26 is connected to the cable 21.

An important feature of the present invention is that the main unit 26 of the system station 25 can have one or more expansion modules 32 connected to it. Each of these expansion modules can have its own output and input ports 33–36. The expansion modules can be constructed differently according to the functions to be performed. For example, if a given system station 25 requires more output ports in addition to the output port 27, one or more expansion modules 32 can be added on, each of which may have one or more additional output ports. Information can be transmitted through the main unit 25 of the system station 26 to the output port 27 of that unit and to output ports 33 and 35 of the expansion module 32. Similarly, the expansion module 32 can provide additional input ports to supplement the input port 28 of the main unit of the system station 26.

Each of the couplers 22–24 of the system has its own binary address. As a result, address signals generated in the central controller 12 can be directed to a specific system station, such as the system station 25 without causing a system station connected to either of the couplers 22 and 23 to respond. In addition, each expansion module connected to a given main unit, such as the main unit of the system station 25, has its own subordinate address to which information can be directed by way of the central station 11 after the main unit of that system station has been activated by receiving its address.

It is necessary that the central controller 12 be programmed according to the capability of each system station. There must, first, be a correlation between each binary address and the actual system station that will respond to that binary address signal. Then there must be information stored at the central controller 12 to cause the central controller to send out proper controlling signals to actuate the specific apparatus connected to the address system station. For example, it may be desirable to pan the camera 29 at the system station 25 to the left, and the central controller 12 must be programmed so that a certain signal can be transmitted to the system station 25 to be processed within that station to produce a signal that will cause a panning motor (not shown) on the camera 29 to move the aiming point of that camera to the left. In addition, the central controller 12 must be programmed to handle information received from the system station 25 and all of the other system stations connected to the transmission medium 21. For example, if one of the input messages to be applied to the input port 28 is derived from a temperature sensor, the central controller 12 must be programmed to utilize that signal from the system station 25 correctly. The central controller 12 must also be programmed correctly according to each expansion module 32, either to supply the proper information to that module or to respond correctly to information from that module.

FIG. 2 shows a block diagram of the system station 25 of FIG. 1 in greater detail. In the embodiment shown in FIG. 2, the station has an RF input/output connector 38 to be connected to the coaxial cable 21 shown in FIG. 1. The connector 38 is connected by way of two coupling circuits 39 and 41 to the input of a receiver 42 and to the output of a transmitter 43. The output of the receiver 42 is connected to an input terminal of a microcomputer 44 that is connected to a connection line 46 and a bus 47. The line 46 connects serial signals from the microcomputer 44 to the transmitter 43 and the bus circuit 47 connects the microcomputer with the output port 27, the input port 28, and a port 48 to which expansion modules may be connected.

The microcomputer 44 also is connected to a switch 49 that is shown as being a single-pole, double-throw switch, the arm of which is connected to one terminal of a capacitor 51. The other terminal of this capacitor is grounded. One of the fixed terminals of the switch 49 is connected to a positive power supply voltage and the other is connected to the transmitter 43.

The microcomputer 44 also has an output connected to an RF switch 52 shown as being a single-pole, single-throw switch. The RF switch is connected to an RF terminal 53 and to a connector 54 shown wired to another connector 56 that is connected to the coupling circuit 39. This embodiment of the system station 25 also includes a local RF input/output connector 57 connected to a terminal 58 that may be hard wired to either of the connectors 54 or 56.

The operation of the system station 25 will be only briefly described at this point since the station is shown in considerably greater detail in FIGS. 3A and 3B, and its operation will be described in greater detail in connection with those figures.

In this embodiment, signals are applied to the system station 25 by means of a modulated carrier, the frequency of which can theoretically be any frequency capable of serving as a carrier for the signals to be applied to and received from the system station 25. Other signals carried on the coaxial cable may limit the availability of certain frequency bands. Typically, and in the absence of other limitation, signals carried to the connector 38 by the coaxial cable 21 may be modulated on a carrier within the band of about 156 to 174 mHz, and signals transmitted from the system station 25 to the coaxial cable may occupy a portion of the band from about 5.75 to about 23.75 mHz. These are the frequencies for receiving and transmitting data signals; additional bands, which are well known in the CATV industry, are used if the signals that pass through the connector 38 are to include television signals.

The RF signal received at the connector 38 from the coaxial cable may have data signals impressed by a suitable modulation of the carrier. Since the data signals are digital bits, or pulses, they may be impressed on the carrier by means of the well-known frequency shift keying (FSK) technique in which the carrier has on frequency when the bit signal has a high, or 1, or mark value and another frequency when the bit signal has a low, or 0, or space value. Other modulating techniques may be used.

The received signal passes through the coupling circuit 41 to the receiver 42 where it is demodulated in any convenient way. The signal is received in the form of a train of carrier waves and, after demodulation, is passed along from the receiver to the microcomputer 44 still in the form of a train of binary bits, but removed from the carrier.

The microcomputer responds to the incoming binary bit signal received from the receiver 42 and, for one thing, changes the serial signal form into a parallel signal form to be applied to the bus 47, which is a multi-conductor structure that connects the microcomputer 44 to the output port 27. The bus 47 also carries signals from the microcomputer 44 to the port 48 through which the signals can be corrected to an expansion module or several expansion modules.

Signals applied to the input port 28 travel back along the bus 47 to the microcomputer 44. There the signals are processed and applied to a bus 46 that delivers them in parallel form to the transmitter 43. The transmitter includes means to generate a carrier, which is then modulated by the signal supplied in serial form from the microcomputer 44 by the line 46. The transmitter 43 includes means to modulate a carrier, for example by FSK. This modulated carrier passes through the coupling circuits 41 and 39 to the connector 38 through which they are coupled to the coaxial cable 21.

If the transmitter 43 generated a carrier for a longer time than was required to transmit the message from the station 25 upstream to the control center 11 (FIG. 1), other system stations would be unable to transmit their messages, although they could all receive messages from the control center because the downstream messages would normally be sent on a carrier having a different frequency than the upstream carrier, as previously discussed. To prevent the transmitter 43 from being operative too long, one of the power supply voltages applied to the carrier generator is not derived directly from the power supply but from the capacitor 51.

A control signal from the microcomputer 44 operates the switch 49, which is actually more likely to be an electronic switch than a mechanical one, to connect the capacitor to the power supply terminal when the transmitter 43 is not active. The power supply voltage charges the capacitor, and when the time comes for the transmitter 43 to send a message upstream, the microcomputer 44 causes the switch 49 to connect the capacitor to the other terminal, as shown, to constitute a power source for the transmitter. The transmitter drains charge from the capacitor until the remaining charge, as measured by the voltage across the capacitor, is too low to keep the transmitter operating. The amount of charge necessary to furnish power at a sufficiently high energy level to the transmitter 43 to transmit a message of maximum length can easily be calculated or measured. By choosing a capacitor 51 having a high enough capacitance to store that amount of charge, the transmitter can operate just as if it were connected to a regular power supply but cannot sustain continuous operation much longer than it should at any one time. Therefore, in a fault condition it would produce interference for only a limited time.

The voltage across the capacitor 51 decreases as the charge is drained off, and this could affect the operation of the transmitter 43. However, by using the capacitor voltage as a base bias voltage on the carrier-generating oscillator in the transmitter 43, the effect of voltage variation can be virtually eliminated. As long as the bias is at or above a certain level, the oscillator will operate satisfactorily. It will cease operating when the bias drops below that level.

The connectors 56 and 58 can be wired together to make a fixed RF connection between the connectors 38 and 57. The microcomputer 44 will have no effect on RF signals passing between the connectors 38 and 57. By joining the connectors 54 and 56 together, as shown, the microcomputer can control the passage of RF signals in either direction through the switch 52. These are not the only possible RF connections, by any means, but are illustrative of one embodiment of the system station 25.

Figure 3B:
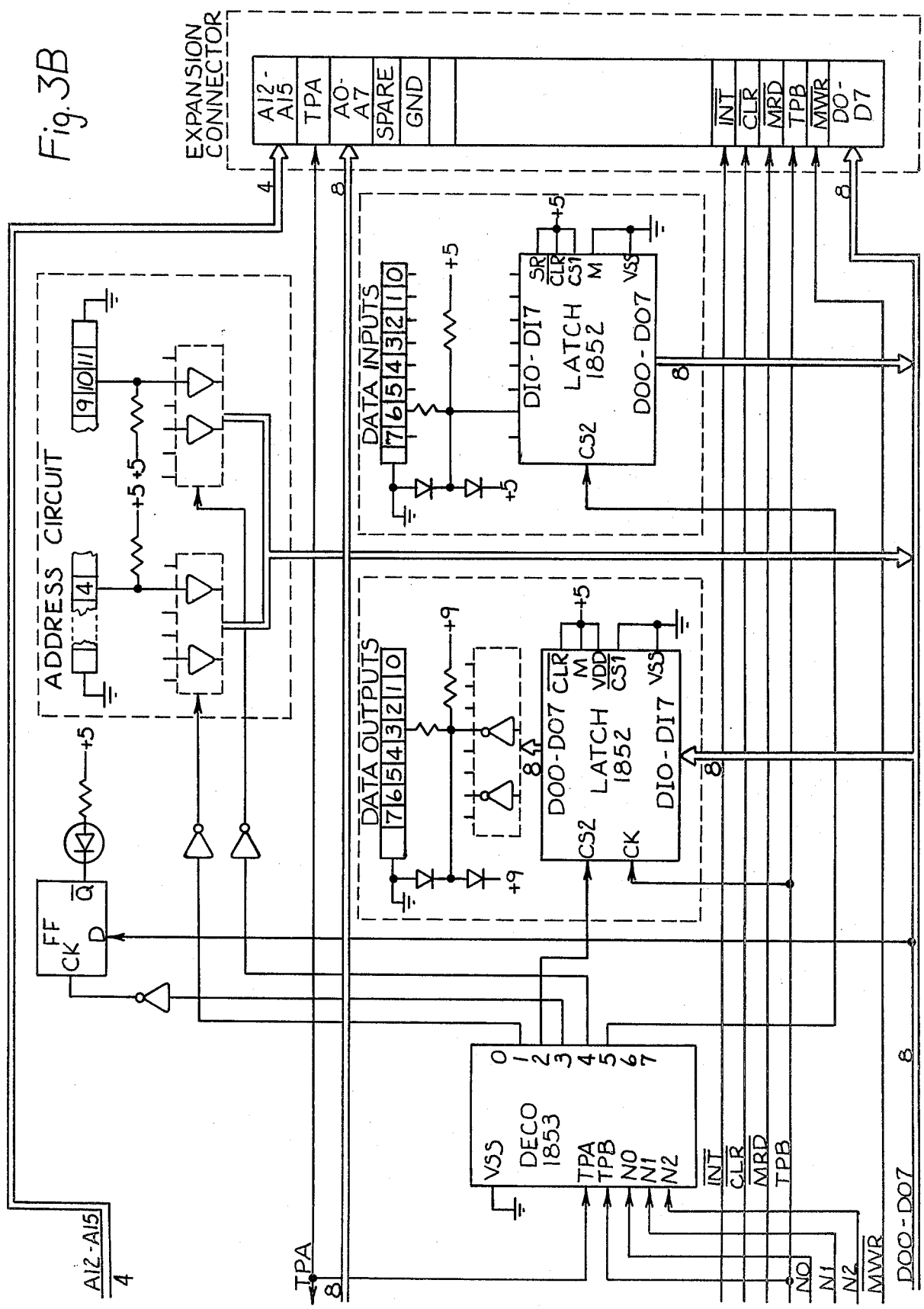

FIGS. 3A and 3B, aligned as shown in FIG. 4, form a block diagram of the main unit 26 in FIG. 1. The input connector through which digital data is received from the receiver 42 in FIG. 2 identified by reference numeral 59, which is connected to a universal asychronous receiver/transmitter, commonly called a UART, 60. A suitable UART for use in the embodiment in FIG. 3A is a type CDP1854 manufactured by RCA and described in the RCA CMOS book, which is incorporated herein by reference. While the UART 60 and other integrated circuits illustrated in this embodiment are specifically identified, the invention is not limited to these specific components nor to the specific circuits illustrated.

Eight terminals, identified collectively by reference nueral 61, of the UART 60 are connected to an 8-wire data bus 62. Each bus section is accompanied by a numeral indicating the number of lines, or wires in that part of the bus. This bus connects the UART 60 to the eight data terminals 63 of a microprocessor 64, such as an RCA type CDP1802 microprocessor. It is this microprocessor that controls the operation of the circuits in FIGS. 3A and 3B in response to signals received from the control center 11 in FIG. 1. The microprocessor 64 has eight address output terminals identified collectively by reference number 65. These terminals are connected to an 8-wire address bus 66. The microprocessor also has an output terminal 67 to be connected to an RF switch, such as the switch 52 in FIG. 2. Other terminals through which the microprocessor 64 is connected to other components in the system station include an interrupt terminal 68 through which the microprocessor receives interrupt signals from the UART 60, a clear terminal 69, a memory read terminal 70, two timing pulse output terminals 71 and 72, three input/output (I/O) address terminals 73–75, and a memory write terminal 76. The microprocessor has other terminals that are not used or are connected to fixed voltages in this embodiment. Finally, the microprocessor 64 has two terminals 77 and 78 across which piezoelectric crystal 79 is connected to determine a master clock frequency to be generated by the microprocessor in use. A resistor 81 is connected across the crystal 79. A frequency of 2.4576 mHz has been found to be quite satisfactory.

The terminal 77 of the microprocessor 64 is connected to a clock input terminal 83 of a type 4024 clock generator 84. The clock generator in this embodiment is a seven stage ripple counter, such as the type MC 14024B produced by Motorola Semiconductors, and has seven output terminals, each of which produces an output pulse signal having a repetition rate one half that of the terminal to its left. Therefore, the repetition rate of the pulse signal at the sixth output terminal 86 is $\frac{1}{2}^6$, or 1/64th, of the crystal frequency, or 38.4 kHz. This signal is connected to both the receive clock input terminal 87 and the transmit clock input terminal 88 of the UART 60 to clock information into the microprocessor 64 and into the UART, respectively.

While the microprocessor 64 has only eight address output terminals 65, which permit 256 binary addresses, a latching circuit 89 is provided to allow higher order addresses. An eight bit input/output port, such as the RCA type CDP1852 may be used as the latch 89. This circuit has eight input terminals indicated as data input terminals, identified collectively by reference number 90, and eight output terminals indicated in a first group of four output terminals 91 and a second group of four output terminals 92. The latch 89 is not used to process data in this circuit but to process address information. The latch includes a clock input terminal 93 connected to the timing pulse A output terminal 71 of the microprocessor 64, as well as several chip select, mode, and voltage supply terminals all of which are connected to fixed voltage points, since the latch 89 is always in use in this circuit and is not selected for only certain processing requirements.

The output terminals 92 of the latch 89 provide $2^4$ times as many addresses as can be obtained with the eight address terminals 65 directly from the processor 64, or a total of 4096 addresses using a total of twelve address bits for each address. That means that a system using only the eight address terminals 65 can have 256 system stations like the system station 25 and each with its individual address. By utilizing twelve address bits, as is possible through the use of the latch 89, a total of 4096 system stations can have individual addresses and be separately addressed. While still more system stations could be addressed using a larger number of address bits, the time required to exchange messages between the central station 11 (FIG. 1) and each of the system stations would be likely to be prohibitively long, so that twelve address bits is considered to be a reasonable maximum.

The eight address terminals 65 of the microprocessor 64 are connected to eight address input terminals 94 of a readonly memory (ROM) 96. A suitable ROM is an RCA type CDP1833. In addition to the eight address input terminals 94, the ROM 96 has eight data input terminals 97 connected to the data bus 62. Three of the higher order address lines MA 8- MA 10, are connected, respectively, to the MUX terminal 98, the chip enable input terminal 99, and the memory read terminal 100. A first chip select terminal 101 is connected to a positive power supply terminal, and a second chip select terminal 102 is connected to the memory read terminal 70 of the microprocessor 64.

The high order address terminals 91 of the latch 89, which are identified by address designations MA12–MA15, are connected to the four input terminals of a 4-input NOR gate 104. The output of this NOR gate is passed through an inverter 106 to one of the inputs of a second NOR gate 107 that has a second input terminal connected to the address line MA11, which is one of the lines connected to the four output terminals 92 of the latch 89. The output of the NOR gate 107 is connected through another inverter 108 to an input terminal 109, the chip enable output terminal, of the ROM 96.

The system also includes a 128-word by 8-bit static random-access memory (RAM)111. An RCA type CDP1823 RAM is suitable for this purpose. Since it can only handle 128 words, the RAM only includes seven address input terminals 112 connected to the seven lowest order address lines MA0–MA6 of the bus 66. The Ram 111 has eight data input terminals 113 connected to the data bus 62 to receive all eight bits of each data byte.

The RAM 111 has five chip select terminals. One of these terminals, identified by reference numeral 114, is connected to the output of the NOR gate 104 while the other four chip select terminals identified collectively by reference numeral 116 are connected to the four high order address output terminals 92 of the latch 89 to receive the address bits MA8-MA11. The RAM 111 also has a memory read terminal 117 connected to the memory read terminal 70 of the microprocessor 64 and a memory write terminal 118 connected to the memory write terminal 76 of the microprocessor 64.

The portion of the main unit 26 shown in FIG. 3B includes an I/O decoder 119. A suitable integrated circuit for use in the embodiment of FIG. 3B is an N-bit 1 of 8 decoder, RCA type CDP1853. The I/O decoder 119 has two timing pulse input terminals 121 and 122 connected to receive, respectively, the timing pulses A and B from the output terminals 71 and 72 of the microprocessor 64. The I/O decoder also has three input terminals 123-125 connected, respectively, to the three I/O command output terminals 73-75 of the microprocessor 64.

The I/O decoder 119 has eight output terminals numbered in the decimal numbers 0-7 corresponding to the binary numbers applied by way of the I/O command terminals 123-125. In the present embodiment, only five of the eight output terminals are used. Two of these output terminals, identified by reference numerals 127 and 128 are connected through inverters 129 and 131, respectively, to an address circuit 132. Two other output terminals 133 and 134 of the I/O decoder 119 are connected, respectively, to a data output circuit 136 and a data input circuit 137. A fifth output terminal 138 of the I/O decoder 119 is connected through an inverter 139 to the clock input terminal 141 of a D-type flip-flop 142. A light-emitting diode 143 connected in series with a current limiting resistor 144 is connected in series between the positive power supply terminal and the $\overline{Q}$ terminal of the flip-flop 142. The D input terminal 146 of the flip-flop 142 is connected to the data line D0 of the data bus 62.

The address circuit 132 includes two terminal strips 147 and 148, each of which has six wiring terminals plus a grounded terminal. Each of the wiring terminals is connected to a respective input terminal of a tri-state amplifier 149 and 151 for the lower six and upper six address bits, respectively. For example, the fourth terminal of the strip 147 is connected to the input of an amplifier 152 within the tri-state amplifier 149 that includes not only the amplifier 152 but five other amplifiers, as well. Another one of these amplifiers 153 is illustrated, but for the sake of simplicity the others are not. In the tri-state amplifier 151, two of the amplifiers 154 and 156 are illustrated. The amplifier 154 shown connected to the terminal marked "10" of the strip 148.

All of the inputs of the amplifiers in the tri-state amplifiers 149 and 151 are positively biased through individual resistors. Two of these resistors, indicated by reference numerals 157 for the amplifier 152 and 158 for the amplifier 154, are illustrated but the others are omitted for the sake clarity. Each of the six output terminals of the tri-state amplifier 149 is connected in parallel with a respective one of the six output terminals of the tri-state amplifier 151 to form a six wire bus 159, which is connected to the lower order six lines of the bus 62.

The output circuit 136 includes a latch 161 that has eight data input terminals 162 connected to the data bus 62 to receive signals therefrom. The latch 161 in this embodiment is an RCA type CDP1852 integrated circuit, which is identical with the high order address latch 89. It has eight output terminals 163, each of which is connected to a respective high-current driver in an integrated circuit 164. Only two of the drivers 166 and 167 are illustrated, but for the sake of clarity, the others are not. Each of the drivers is connected to a respective terminal of the data output port 27. Each of the drivers has a pull-out resistor, similar to the pull-up resistor 168 connected to the driver 166. In addition, there is a series resistor similar to the resistor 169 connected between each of the drivers and its respective terminal in the output port 27. Two diodes, such as the diodes 171 and 172, are connected in series between ground and a positive power supply terminal, with the common circuit point between the two diodes connected to the common circuit point between the resistors 168 and 169 and the output terminal of the driver 166.

The connection from the terminal 133 of the I/O decoder 119 to the output circuit 136 is made to a chip select terminal 173 of the latch 161. In addition, the timing pulse B from the output terminal 72 of the microprocessor 64 is connected to an input terminal 174 of the latch 161 as a clock signal. Other terminals that control the operation of the latch 161 are connected to fixed voltages, either at ground potential or at a positive power supply potential.

The input circuit 137 is similar to the output circuit 136 and uses a latch 176 that is the same as the latch 161 and the high order address latch 89. However, the latch 176 is connected in the reverse manner from the latch 161 since signals are to pass through the latch 176 from the data input port 28 to the data bus 62. Thus, it is the eight data output terminals 177 of the latch 176 that are connected to the bus 62. The eight data input terminals are connected to respective terminals of the input port 28. A complete circuit is shown for only one of the data input terminals 178 for the sake of clarity. This input terminal is connected through a resistor 179 to a terminal "6" of the data input port 28 and is provided with a pull-up resistor 181. The common circuit point between the terminal 178 and the resistors 179 and 181 is connected to the common circuit point between two protective diodes 182 and 183 connected in series between ground and a positive power supply terminal.

The connection from the terminal 134 of the I/O decoder 119 to the input circuit 137 goes to a chip select terminal 184 of the latch 176. The remaining terminals of the latch 176 are connected either to ground or to a positive power supply terminal.

The main unit 26 of each system station 25 (FIG. 1) includes an expansion connector 186. This connector has enough terminals to accommodate all of the connections necessary to operate an expansion module. These terminals include eight terminals identified collectively by reference numeral 187 to accommodate eight lines of the data bus 62, a terminal 188 connected to the memory write terminal 76 of the microprocessor 64, a timing pulse B terminal 189 connected to the output terminals 72 of the microprocessor, a memory read terminal 190 connected to the output terminal 70 of the microprocessor, a clear terminal 191 connected to the output terminal 69 of the microprocessor, an interrupt terminal 192 connected to the terminal 68 of the microprocessor, a ground terminal 193, at least one spare terminal 194, eight low order address terminals identified collectively by reference numeral 195 connected to the address bus 66, a timing pulse A terminal 196 connected to the output terminal 71 of the microprocessor 64, and four high order address terminals identified collectively by reference numeral 197 connected to the four wire high order address bus 95, and a power supply terminal 198.

The operation of the system described in connection with FIGS. 1-4 is byte-oriented in the sense that the elemental digital bit signals are grouped into bytes which, in turn, are grouped into message signals. In particular, the embodiment illustrated is constructed to utilize bytes having eight data bits, each. In addition to the eight data bits, each byte includes a start bit that immediately preceeds the eight data bits, a parity bit that immediately follows the eight data bits, and a stop bit that follows the parity bit. Thus, each total byte includes eleven bits.

The fact that the individual data bits are grouped into bytes does not make the system synchronous, even through a byte is considered to be the basic unit of data length. This system is arranged so that each message from the control center 11 in FIG. 1 includes at least three bytes, but it may contain a total of 128 bytes for a message that contains that much information. The system is asynchronous in the sense that it is not necessary to arrange the components so that a total message length of 128 bytes must be set aside for every message, even one of minimal information content.

Both downstream messages from the control center 11 to the system stations and upstream messages from the system stations to the control center are based on eleven bit bytes containing eight data bits. The system can be operated as a one-way system in which information proceeds only downstream. However, this type of operation fails to utilize important features of the overall concept. Two-way communication is likely to be the most common usage of this invention.

The control center 11 is most likely to operate by polling each of the system stations in order, although it is not necessary that the control center follow this mode of operation. Since the bytes may not be inherently distinguishable from each other, it is necessary to provide a special digital signal at the beginning of each message from the control center 11. In order to be certain that this special signal, which synchronizes the operation of the entire system at the beginning of each message, does not duplicate any possible byte, it should be at least twelve bits long, and each bit should be of the same polarity, for example all 1's. Synchronization signals are sent not only downstream but, like other byte signals, may be sent either upstream or downstream. According to the convention established in this invention, the first proper byte signal following the synchronization signal contains control information and is, therefore, called a control byte. Each of the data bits in the control signal has a specific meaning, but some are utilized only in downstream transmissions and others only in upstream transmissions. the circuit described herein operates on the basis that, if a particular element of information is true, the bit that contains the element is a 1; otherwise, it is a 0. Thus, those elements that would be sent only downstream would be represented by a 1 bit (if they were true) and would be represented by a 0 bit in a control byte directed upstream. The converse is also true. As a specific example, the first data bit in each control byte indicates whether the message is going downstream or upstream. If it is going downstream, the first bit is a 1; if upstream, the bit is a 0. The next bit can indicate whether the message will be addressed to an address containing only one byte or one that requires two bytes. For example, if the second bit of the control byte is a 1, the message will be addressed utilizing the next two bytes. On the other hand, if the second bit is a 0, the address will be contained within the next byte following the control byte. It is partly for this reason that the control byte, which causes each of the system stations to go through the same analysis and preparation, precedes the address byte or bytes.

The third bit of the control byte may be used to indicate whether the system station addressed should send back a return signal or not. For example, if the system is sending group-addressed messages, no return message would be expected, and this bit of the control byte will be a 0.

The fourth bit of the control byte may be used to indicate whether the following address signal is to address a group of system stations or only a single station. If it is to address a group, the group may include all of the system stations simultaneously, as would be appropriate to deliver an emergency message by turning on a receiver at each system station. There are other occassions when all of the system stations should be addressed simultaneously and there are further occassions when a smaller group of system stations should be addressed.

The fifth bit can be used to control the addressed station to indicate whether that station is to include its own address in making a response. Since any response from an addressed system station would immediately follow the downstream signals related to that station, the control center 11 could operate on the assumption that any response received immediately following a downstream message would come from the station just addressed. However, it may be desirable to include the address of the responding station in its return message, just to make doubly sure that the proper system station is acting upon the message.

The sixth bit can be used as a flag by the system station. This would be included in a message sent upstream from the system station to alert the control center 11 that the system station just addressed had information to convey. This might be arranged to prevent the control center 11 from proceeding to poll the next system station address and would require the central control to hold further transmissions in abeyance until the message from the addressed system station was completed, or the flag could cause the central control to prepare to accept information on the next polling.

The seventh bit may indicate an error in the signal just received by the system station. It could also indicate an error received by the control center in a message from the system station.

The eighth bit is available, if needed, but if it is not, it could be represented by a 0.

Following the eight bits, a parity bit is transmitted, which is either a 1 or a 0 depending on whether there was an odd or even number of 1 bits in the control byte and further depending on whether odd or even parity was being used.

Following the parity bit is a stop bit, which has been chosen to be a 1. Unless that stop bit is the last stop bit in a message, it would immediately be followed by a start bit for the next byte. The start bit is a 0 so that there will always be a transition from 1 to 0 at the beginning of each byte.

The second byte in the message is an address byte. If there are more than 256 addresses, more than one byte is required, and it is preferably that the least significant address byte be sent first. This would consist of address bits 0-7. Only the first four bits of the second address byte refer to a specific system station. These constitute address bits 8-11. The other four bits in the second address byte are not directed to a specific system station but identify various modes of group addressing. For example, it may be convenient to cause the high order bits 12-15, which are produced at the output terminals 91 of the latch 89 in FIG. 3A and applied to the bus 95, to be all 1's if all of the system stations are to be addressed simultaneously. Two other groups of system stations that might be addressed as groups are all stations having the same first address byte and all stations having the same arrangement of bits in the group of four bits that form the first part of the second address byte. One of these groups might be addressed by, for example, causing the four highest order bits on the bus 95 to be 0001. The other group might be addressed by causing the four bits on the bus 95 to be 0010. The three binary numbers suggested for selecting the three different groups just mentioned are arbitrary; there are sixteen possible binary numbers, and any three could be selected for the purpose just set forth. Still other groups could be selected based on use of the other thirteen binary numbers. The reason for selecting groups of system stations is that a system could be arranged in which groups of stations having some relation to each other, such as location, might need to be addressed simultaneously. Another reason is that the system might be used as part of a control system for a manufacturing complex, and stations having related operational data might need to be addressed simultaneously.

The lower order four bits in the second address byte are available at the output terminals 92 of the latch 89 and are applied to four of the chip select terminals 116 of the RAM 111. Three of these bits are also applied to three of the control terminals 98-100 of the ROM 96. Actually, the fourth of these bits is also utilized in controlling the ROM, although not directly, and all four of the higher order bits of the second address byte are utilized in controlling both the RAM 111 and the ROM 96.

The latter control is obtained by way of the four-input NOR gate 104, which receives all four of the higher order address bits of the second address byte. The output of this NOR gate is a 1 only when all four of the bits on the bus 95 are 0. Otherwise the output of the NOR gate 104 is a 0.

The output of the NOR gate is inverted by the inverter 106 and applied to the second NOR gate 107 along with the address signal MA 11, which is the highest order bit of the lower four bits of the second address byte. The output of the NOR gate 107 is a 0 if either of its inputs is 1 and is a 1 only if both of its inputs is a 0. The output of the NOR gate 107 is inverted by the inverter 108 and applied to the input terminal 109 of the ROM 96. Therefore this input terminal of the ROM receives a 1 only if the bit carried on the line MA 11 from the output terminal 92 is a 1 or if any of the four bits on the bus 95 is a 1.

The address of a system station 25 in the system in FIG. 1 is determined by the wiring of the terminal strips 147 and 148 in the address circuit 132 in FIG. 3B. Each of the numerically identified terminals normally has a high, or 1, value as illustrated by the connections to the terminals 147a and 148a. By physically wiring any one of the numbered terminals on the strips 147 and 148 to the ground terminal, the value at the input to the corresponding amplifier in the tristate amplifiers 149 and 151 becomes a 0. For example, connecting the terminal 147a to the ground terminal causes the input to the amplifier 152 to be 0. This does not affect the input to the amplifier 153 or to any of the other amplifiers in the tri-state amplifier 149. Since there are twelve amplifiers within the tri-state amplifiers 149 and 151, there are 4096 different possible combinations.

These combinations of 1's and 0's at the inputs to the individual amplifiers like the amplifiers 152 and 154 become the addresses of the main unit 26, and therefore of the system station 25, by virtue of the connection of the output of these amplifiers through the bus 159 to the bus 62. The synchronizing signal that proceeds the control byte at the beginning of each station signal operates through the UART 60 and the microprocessor 64 to apply binary command signals in an increasing sequence to the terminals 123-125 of the I/O decoder 119 to drive each of its eight output terminals to a 1 value in a corresponding sequence. When the I/O decoder 119 receives command signals on its input terminals 123-125 that correspond to the binary number 001, which is the same as the decimal number 1, the output terminal 127 takes on the value 1. This allows the tri-state amplifier 149 to be enabled, through the inverter 129, to transfer the first six address bits through the the bus 159 to the bus 62. The tri-state amplifier 149 is disabled as soon as the command signals to the terminals 123-125 of the I/O decoder count beyond 001. When the command signals on the input terminals 123-125 of the I/O decider 119 reach the binary count 100, the output terminal 128 changes from a 0 to a 1, thereby enabling the tri-state amplifier 151, through the inverter 131, to transfer information concerning its six individual amplifiers to the bus 159 and on through the bus 62 to storage means within the microprocessor 64. Thus, the connections of the strips 147 and 148 are transformed into electrical signals and stored in the microprocessor as a result of the synchronizing signal. These stored signals are then available to be compared with information contained in the address byte or bytes that are applied to the UART 60 in the next address byte, or bytes, following the control byte.

The data output circuit 136 and the data input ciruit 137 have many similarities. Each of them connects a plurality of individual terminals to the data bus 62, the circuit 136 to carry signals from the bus to the terminals 27 and the circuit 137 to carry signals from the terminals 28 to bus 62.

Although the latch 161 in the output circuit 136 could supply the 8-bit data signals that it receives from the bus 62 to the output port 27 as an 8-bit binary number, the circuit is actually set up so that each of the terminals in the output port 27 is a separate terminal to a separate device (not shown). For example, the 8 terminals in the output port 27 could be connected to 8 heater switches or to one heater switch and 7 electromagnetically controlled door strikes or any other device to be controlled by an on-off signal. The input signal to the input terminals 162 of the latch 161 would determine which of the terminals in the output port 27 was to be actuated at any time.

Because it is possible that the terminals in the output port 27 may be devices that could draw a substantial amount of current, the output circuit 136 includes the high-current drivers 164 so as not to overload the output terminals 163 of the latch 161.

The input circuit 137 receives only input signals and does not have to supply high-current output signals. Therefore the input circuit 137 dos not include any current drivers similar to the drivers 164 in the output circuit 136. Instead, each of the terminals of the input port 28 in the input circuit 137 is connected directly to a corresponding input terminal of the latch 176 by way of a resistor 179 that limits any current that might be applied. In addition, the diodes 182 and 183 prevent any excessively high voltage from being applied to the input terminal 178 of the latch 176. Corresponding diodes would protect each of the other input terminals to the latch.

Each of the terminals in the input port 28 may be connected to an on-off sensor, such as a burglar alarm, a thermostat, a relay or any of a number of other devices. Although a thermostat appears to be an analogue device, it would be treated, if connected to one of the terminals of the input port 28, as an on-off device simply indicating that the measured temperature was above or below the set point of the thermostat. Of course, the input port 28 could be operated as the unit to feed more complex information into the bus 62. For example, an analogue-to-digital converter would be connected to an analogue signal source to convert the analogue voltage into an 8-bit digital voltage, and these 8-bits could then be supplied to the 8 terminals of the input port 28.

Another possible use for both the output circuit 136 and the input circuit 137 is in a communication system in which the 8 terminals of the output port 27 fed signals to a printer and the 8 terminals of the input port 28 received signals from a keyboard, perhaps attached to that printer.

There are numerous other devices that could be connected either to the input port 28 or to the output port 27 so that signals from such devices could be entered into the bus 62 and carried back to the microprocessor 64 or to the UART 60 or any of the other circuits connected to the bus 62.

If additional output circuits are needed to supply information to more locations than can be accommodated by the output circuit 136 with its 8 terminal output port 27, or if additional input terminals are required, they may be incorporated in to a module to be plugged into the expansion connector 186. This connector contains the full array of control, address, and data lines and can therefore operate equipment as complex as is shown in FIGS. 3A and 3B.

When data is generated in the system station, for example in the form of a minimal answer to an interrogation from the control center 11 in FIG. 1, it is applied to the data bus 62 and carried to the terminals 61 of the UART 60. Outgoing signals are then transformed from the parallel form to serial form and are passed out through a send data terminal 199 which is connected to the transmitter 43 in FIG. 2. The switch 49 in FIG. 2 is connected to a terminal 201 of the UART 60 to be placed in the operative condition illustrated in FIG. 2 to transmit a message. Normally the switch 49 in FIG. 2 is transfered back to the other terminal, which is connected to the power supply voltage, exactly at the end of a message from the UART 60 and this transfer is effected by a signal from the output terminal 201. It is only if something goes wrong and there is no proper signal from the terminal 201 that it becomes necessary to rely on the limited amount of current that may be drawn from the capacitor 51 in FIG. 2.

Figure 5:
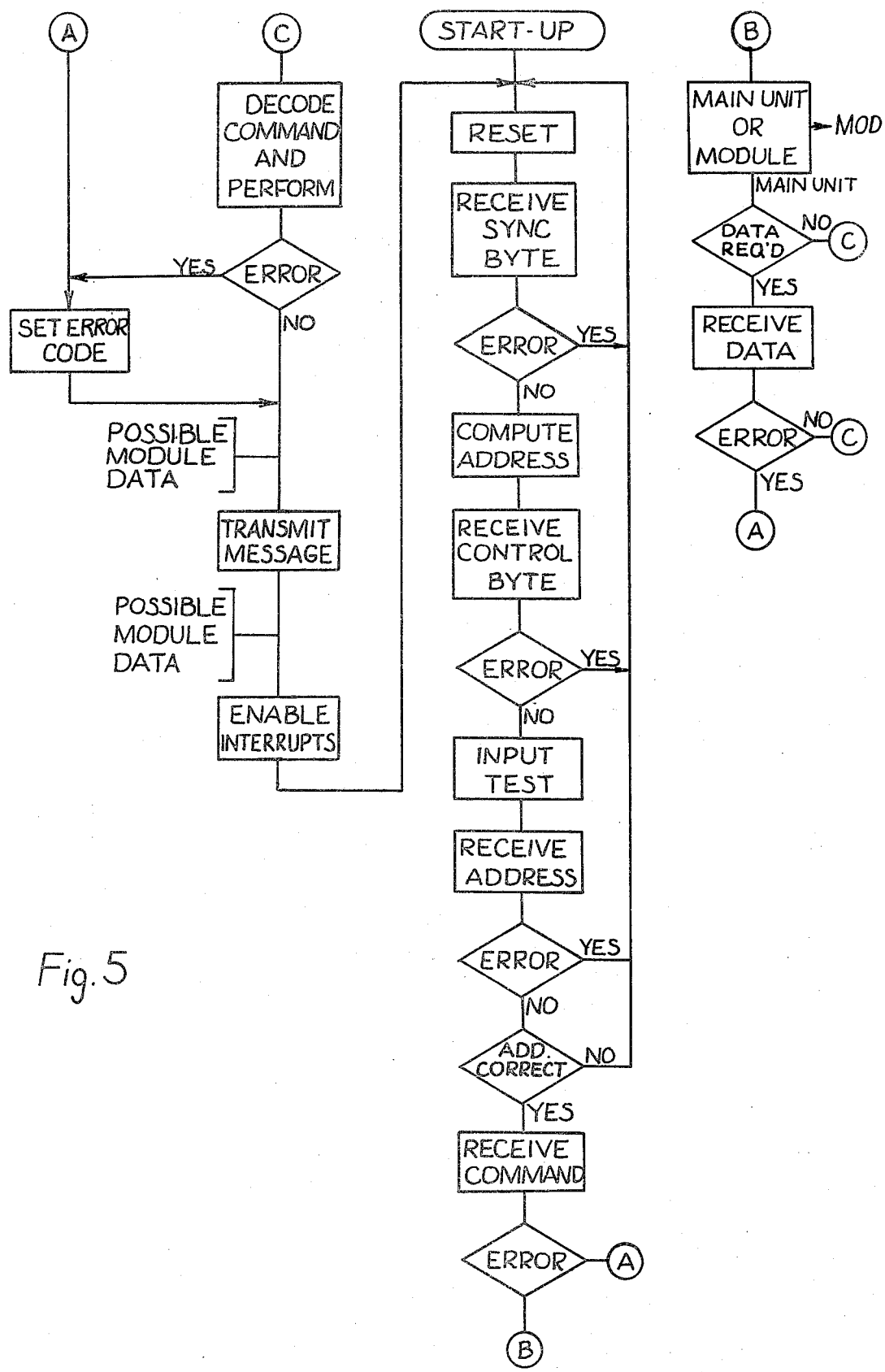
FIG. 5 is a flow chart of the system station in FIGS. 3A and 3B.

FIG. 5 shows a flow chart to handle the signals from a system station 25 as shown in FIG. 1. The first operation that a system station must undergo upon being put into service is the start-up operation that initializes the condition of circuits in the main unit 26 as soon as power is applied to it. This resets the circuit to a suitable condition.

When the control center 11 in FIG. 1 sends out a signal to any station or any group of them, the first part of the message is a synchronizing signal which may be called a synchronizing byte but is actually longer than a standard byte. According to the chart in FIG. 5, after reception of a synchronizing byte, it is measured for errors. If there are any, the circuits are reset and a new synchronizing byte is awaited. On the other hand, if there are no errors, the system is then ready to compute the address by operation of the address circuit 132 in FIG. 3B. The address is generated very quickly and in time for the main unit 26 to receive the control byte that follows immediately after the synchronizing byte. The main unit then measures the control byte to determine whether or not there are any errors in it. These are errors that simply would not be permissible. They are not errors of a type that could cause the control byte to resemble an acceptable control byte. If such errors are measured, the circuits are reset to await the next synchronizing byte.

If there are no errors in the control byte, an input test is performed internally and then the circuit is ready to receive the address byte or bytes, as the case may be. The address byte is measured to determine whether or not there are errors of a type such that the byte could not constitute any address. If such errors are found, the circuits are reset. If there are no such errors, the address signal is compared with the address stored in the microprocessor to determine whether or not the particular system station 25 is being addressed, either individually or as part of a group. If it is not, the circuits are reset to await a later message directed to that system station alone or as part of the group.

If the address is correct, the system station is then in condition to receive the command signal that determines the functions to be performed by the system station. The command signal is included in the byte that immediately follows the last address byte. It has been arranged in the system illustrated in the drawing to use the first four bits of the command byte to identify functions to be performed and to use the four higher order bits of the command byte to determine whether those functions are to be performed within the main unit 26 or by a specific expansion module. The illustrated embodiment has further been arranged so that if the four higher order bits are 0000 or 1111, the function included in the four lower order bits will be performed by the main unit 26. There are fourteen other numbers between 0000 and 1111, and those are used as address signals for expansion modules connected to that system station. Of course, there may not be fourteen expansion modules, and in fact, it is unlikely that there would ever be that many. However, the system does provide for fourteen modules, and even that number is not to be considered as a limitation on the invention but merely a number than can be accommodated without too much likihood of overloading the signal-carrying capacity of the system.

The commands that may be included in the four lower order bits of the command byte may be such things as reporting on the output port, reporting on the input port, turning the RF switch on, turning the RF switch off, etc. All of these functions are to be performed by the main unit 26 and thus the four higher order bits of the command byte would be either 0000 or 1111 when such commands were given.

One of the functions that may be performed by the main unit 26 upon command is associated with the flip-flop 142 and the LED 143 shown in FIG. 3B. If a complaint is received that a particular system station 25 is not operating, an operator at the control center 11 in FIG. 1 may speak by phone with someone at the location of that system station and request the person at the system station to observe the LED 143. Then the control center equipment is caused to transmit a command to the flip-flop 142 to turn on the LED 143. If the LED does turn on and that fact is confirmed by telephone by someone observing the LED, the operator at the control center will know that at least messages are getting through to the system station and are being processed correctly, at least to some degree. This limits the area in which a repair person would have to look to find the actual fault.

The control center may transmit as many as 124 data bytes to each system station as part of a single message. These 124 data bytes are, in addition to the control byte, two address bytes (if needed) and a command byte, making a total of 128 bytes. Messages sent upstream from a system station 25 need not include a command byte and so may have anywhere from 0 to 125 data bytes.

Before the command can actually be carried out, it is checked for error. If it is found to be in error, an error code is set, which means that a flag in the control bit from the system station is set to a 1 value. Then the UART 60 is actuated to transmit the message upstream to the control center, carrying the flag indicating an error. Following this, interrupts are enabled and the circuits of the system station are reset.

If there are no errors, the command byte is examined to determine whether the command is intended for the main unit or the module and is sent to the appropriate location in either of those units.

If the information is to go to the main unit, the command byte is examined to determine whether data is required. If it is, the system is then in condition to receive the data, which is then checked for error, such as parity error.

If no data is required, the command is decoded and the function performed. This is also measured for error and, if there is an error, the error is set and a message is transmitted upstream to the control center as previously described. If there is no error, a proper responsive message is transmitted upstream to the control center.

If a message is required that would include data from the module or modules, such data is entered into the UART 60 to be transmitted back to the control center.

It may be that the module data is not to be transmitted but is to enable interrupts so as to reset the system station for the next message. If so, that is done after the transmission of such message as is appropriate.

What is claimed is:
1. An expandable communication system comprising:
 a. a signal-carrying medium comprising a plurality of terminals at which signals can be entered into and extracted from the signal-carrying medium;
 b. a control center comprising:
  (1) control center transmitter means to generate at least a first carrier, the transmitter means being connected to a first one of the terminals to supply the first carrier to the medium to be conveyed away from the control center in a downstream direction,
  (2) control center receiver means connected to the first terminal to receive a second carrier conveyed by the medium in an upstream direction toward the first terminal,
  (3) control signal generating means to generate digital bit signals grouped into bytes, each byte including a fixed number of the bit signals, successive groups of the bytes comprising station-related signals, each group of station-related signals comprising: an initiation byte, a control byte to define certain contents of other bytes in the same group, and an address signal including at least one address byte, at least some of the station-related signals also comprising response-request signals and downstream data byte signals, the number of such downstream data bytes in a given group of station-related signals being based on the amount of data to be conveyed at that time to any station addressed by that group of station-related signals, the control signal generating means comprising incrementing circuit means to change the address signal in successive station-related signals to generate the station-related signals as polling signals to poll, in repetitive polling cycles, a group of system stations; and
 c. a plurality of system stations, each connected to a respective one of the terminals downstream from the first terminal and each comprising:
  (1) station receiver means to receive at least the first carrier traveling downstream along the signal-carrying medium from the control center,
  (2) controlled circuit means connected to the station receiver means:
   (i) to respond to the initiation byte and the control byte of each group of station-related signals and to the address signal of those station-related signals that include the address signal of that specific station, the controlled circuit means of each of the stations being capable of responding to different numbers of data bytes than other stations polled in the same polling cycle, and
   (ii) to generate station digital bit signals grouped in station bytes comprising at least an address signal and a control byte signal,
  (3) address circuit means connected to the station receiver means and to the controlled circuit means to control the respective system station to respond only to station-related signals including the address signal of that system station,
  (4) output circuit means comprising a plurality of output terminals, the output circuit means being connected to the controlled circuit means to be controlled by signals therefrom to provide controlled output signals determined by the data signal in the respective station-related signal,
  (5) input circuit means comprising a plurality of input terminals to receive signals originating at the respective system station, the input circuit means being connected to the controlled circuit means to be controlled by signals therefrom,
  (6) station transmitter means to generate station signals to be carried upstream by the signal-carrying medium, such signals including at least the second carrier modified by the station digital signals, the transmitter means being connected to the input terminals to be controlled in part by the signals applied to the input terminals and being connected to the controlled circuit means to be controlled in part thereby to modify the second carrier according to selected station digital signals and to apply the station signals to the signal-carrying medium at least partly in response to the station-related signals, and (7) expansion terminal means connected to the address circuit means to receive expansion address signals therefrom and connected to the controlled circuit means to receive expansion circuit control signals and expansion circuit data signals therefrom and to transmit expansion circuit data signals thereto.

2. The expandable communication system of claim 1 comprising, in addition, an expansion module, comprising:
   a. expansion module input connector means connectable to the expansion terminal means to transmit data signals between the expansion module and the controlled circuit;
   b. expansion circuit means; and
   c. expansion circuit control means connected to the expansion module input connector and to the expansion circuit means to control, at least in part, the transmission of expansion circuit data signals between the expansion circuit means and the expansion module input connector.

3. The expandable communication system of claim 2 in which the expansion circuit means comprises a plurality of data output ports.

4. The expandable communication system of claim 2 or claim 3 in which the expansion circuit means comprises a plurality of data input ports.

5. The expandable communication system of claim 2 in which the expansion circuit means comprises a plurality of multi-bit ports and the expansion circuit control means activates each of the multi-bit ports in sequence.

6. The expandable communication system of claim 2 in which the expansion circuit control means comprises expansion module address means to recognize, in the expansion circuit control signals, the address of the respective expansion module.

7. The expandable communication system of claim 1 comprising, in addition, an expansion module comprising:
   a. expansion module input connector means connectable to the expansion terminal means to receive expansion circuit address and control signals therefrom and to transmit expansion circuit data signals thereto;
   b. expansion module output connector means connected to the expansion module input connector means to receive second expansion circuit address and control signals therefrom and to transmit second expansion circuit data signals thereto; and
   c. expansion module address recognition circuit means connected through the expansion module input connector means to the controlled circuit means and to the address circuit means to respond to signals bearing the address of the respective expansion module.

8. The expandable communication system of claim 7 comprising, in addition, expansion module data processing circuit means connected to the expansion module imput connector means and to the expansion module address recognition circuit means to process data signals in the expansion module.

9. The expandable communication system of claim 8 in which the expansion module data processing circuit comprises error code generating circuit means to generate an error code signal and to transmit the error code signal through the expansion module input connector means, the expansion terminal means, and the controlled circuit means to the station transmitter means.

10. The expandable communication system of claim 8 or claim 9 in which the expansion module data processing circuit comprises attention signal generating circuit means to generate an attention signal and to transmit the attention signal through the expansion module input connector means, the expansion terminal means, and the controlled circuit means to the station transmitter means to be transmitted upstream to the control center to prevent production of a different address signal.

11. The expandable communication system of claim 1 in which the control center transmitter means comprises a circuit substantially the same as the circuit of the station transmitter means, the control center receiver means comprises a circuit substantially the same as the circuit of the station receiver means, and the control signal generating means comprises circuits substantially the same as the controlled circuit means in the system station.

* * * * *